Feb. 25, 1936.  H. P. PETZNICK  2,032,096
TRAIN PIPE COUPLING
Filed April 30, 1934  4 Sheets-Sheet 1
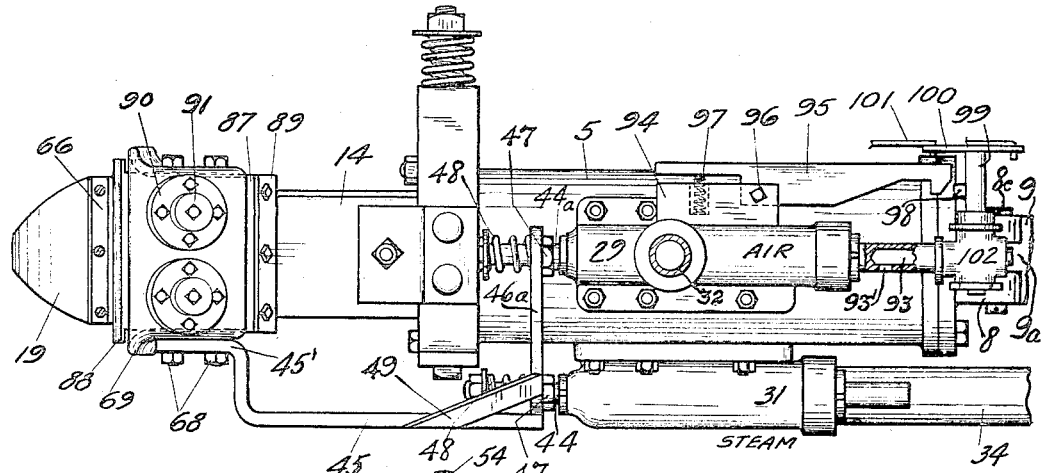
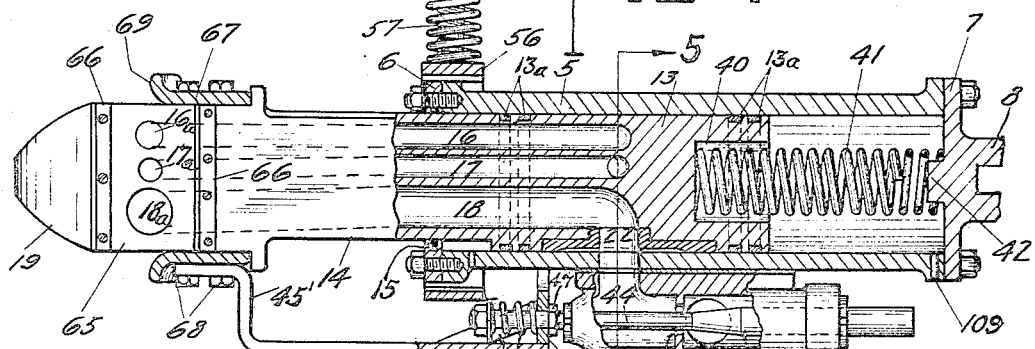
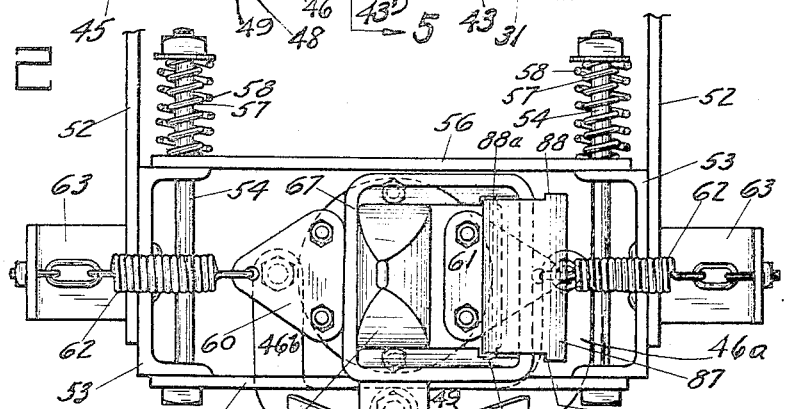
INVENTOR
Herman P. Petznick
BY J. Daniel Stuwe
ATTORNEY Feb. 25, 1936.  H. P. PETZNICK  2,032,096
TRAIN PIPE COUPLING
Filed April 30, 1934    4 Sheets-Sheet 2
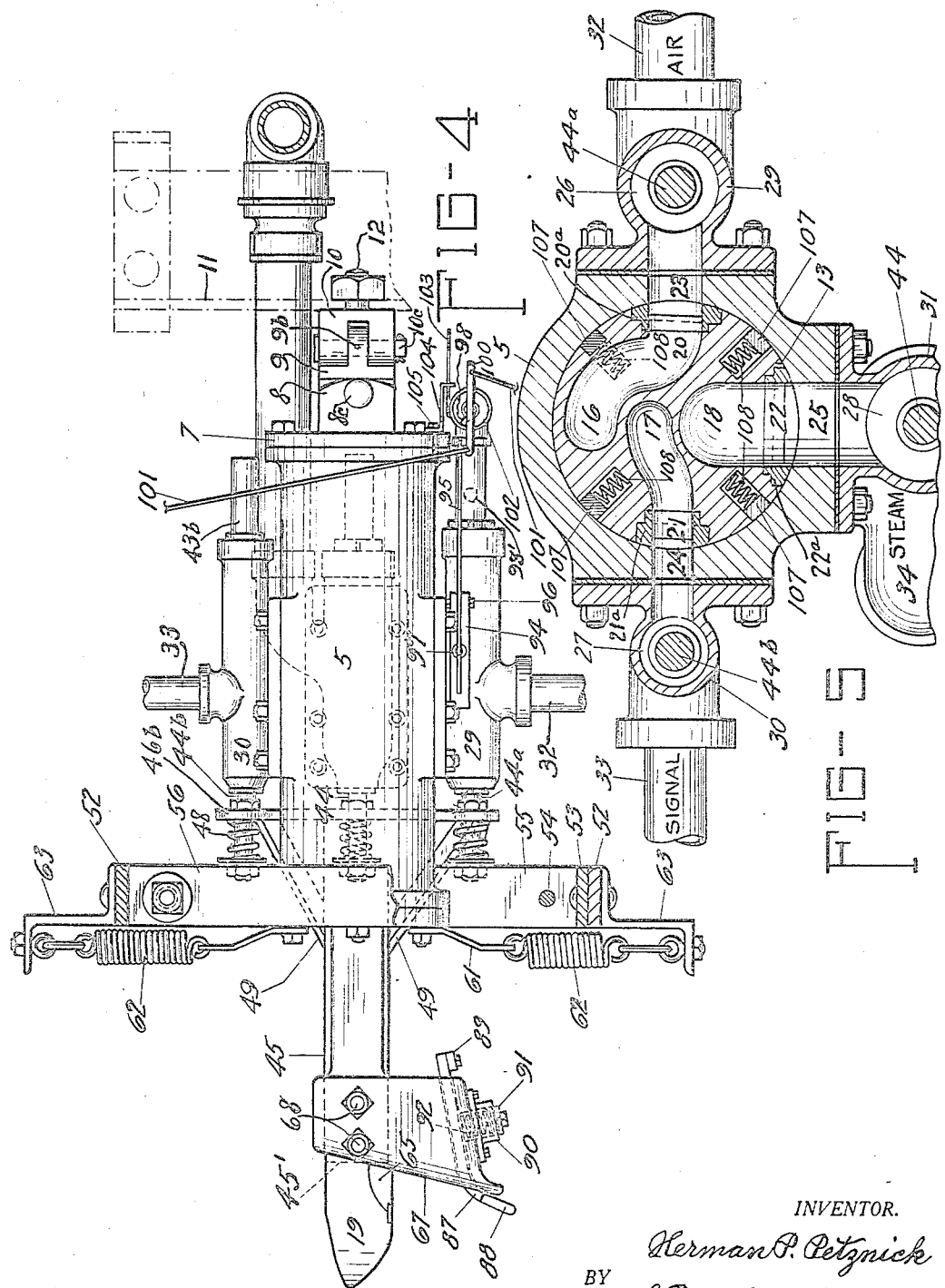
INVENTOR.
Herman P. Petznick
BY J Daniel Stuwe
ATTORNEY.

Feb. 25, 1936. H. P. PETZNICK 2,032,096
TRAIN PIPE COUPLING
Filed April 30, 1934 4 Sheets-Sheet 3

INVENTOR.
Herman P. Petznick
BY J Daniel Stuwe
ATTORNEY.

Feb. 25, 1936.  H. P. PETZNICK  2,032,096
TRAIN PIPE COUPLING
Filed April 30, 1934   4 Sheets-Sheet 4
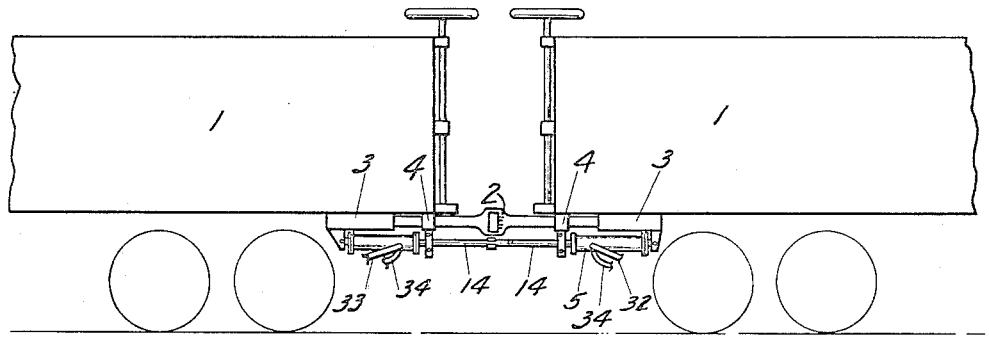
FIG-8
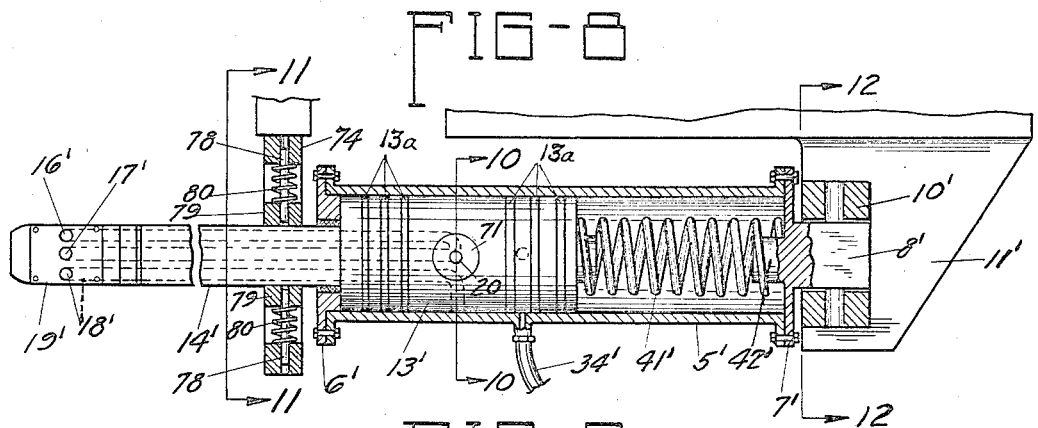
FIG-9
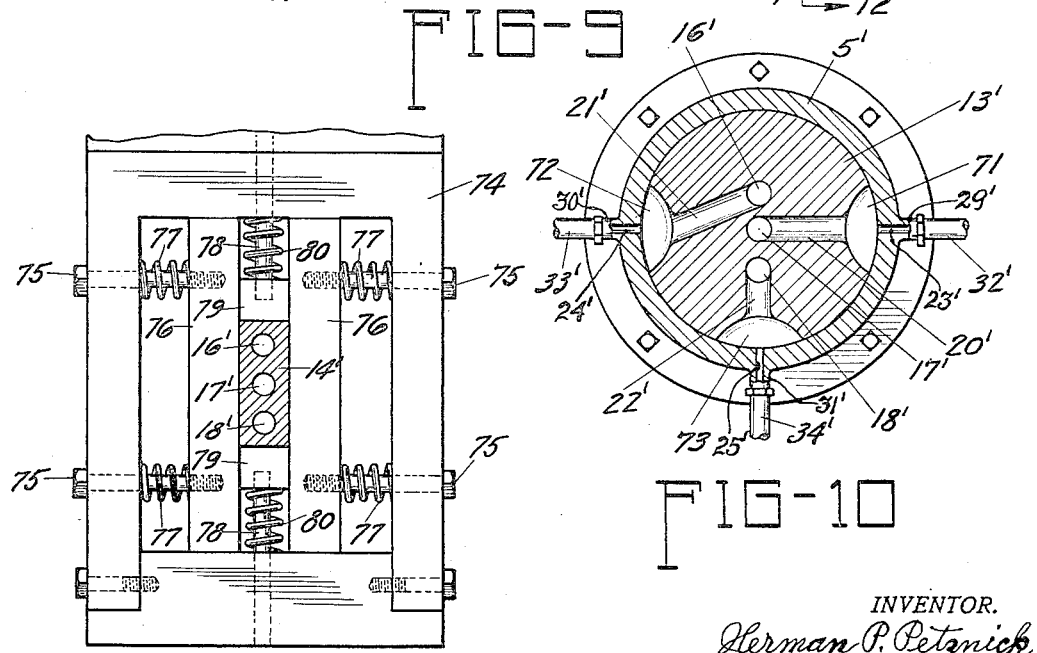
FIG-11   FIG-10
INVENTOR.
Herman P. Petznick
BY J. Daniel Stuwe
ATTORNEY.

Patented Feb. 25, 1936

2,032,096

UNITED STATES PATENT OFFICE 2,032,096

TRAIN PIPE COUPLING

Herman P. Petznick, Davenport, Iowa

Application April 30, 1934, Serial No. 723,036

21 Claims. (Cl. 284—6)

This invention relates to improvements in train pipe couplings.

One of the main objects of my invention is to provide an improved coupling mechanism whereby the various train pipes or conducting lines on the cars and coaches of a train will be automatically coupled by the coupling of said cars, and whereby the pipes of connected cars will be held firmly together under the various adverse conditions of travel and operation of the train.

Another object of this invention is to provide an automatic train pipe coupling whereby the pipe lines of cars will always couple properly when brought together, even on sharply curved and rough tracks, and whereby the pipe lines will remain continuously coupled in fluid-tight relation although traveling around the sharp curves and while being jolted on the rough tracks.

A further object is to provide a coupling device which is so arranged and constructed that if the cars are accidentally uncoupled, as by breaking apart of the train, and the companion coupling devices become disconnected, the mechanism will function automatically to bleed the air-brake line for setting the brakes.

A still further object is to provide a train pipe coupling device whereby the air-brake line on a car can be bled gradually and intermittently by a person located at the side of the car and free from any danger therefrom, so as to enable him to apply the air-brakes intermittently, for gradually slackening the travel of a car and stopping it in a desired spot.

Another object of this invention is to provide an efficient automatic train pipe coupling device whereby the various train lines can be readily coupled and will be retained firmly coupled under the various adverse railway conditions, and which device is provided with safety means for setting the brakes upon accidental breaking of the train and separating of the coupling devices, said safety means being further arranged to be readily controlled from the side of the car for gradually slowing and stopping an individual car in any predetermined position.

These and other objects and advantages are attained with this invention, as will become apparent from the following description, taken in conjunction with the accompanying drawings wherein the invention is shown in its preferred forms of construction, it will be understood that they are illustrative only and should not be interpreted in a limited sense.

In the accompanying drawings:

Fig. 1 is a side elevation of the present preferred form of this invention, showing the parts in the position they assume when the cars are coupled.

Fig. 2 is a similar view partly in section, to show the internal construction of the structure shown in Fig. 1.

Fig. 3 is an end elevational view taken from the left in Fig. 1.

Fig. 4 is a plan view of the structure shown in Fig. 1, partly broken away.

Fig. 5 is a transverse section taken substantially along the plane indicated by the line 5—5 of Fig. 2.

Fig. 8 is a view in side elevation showing cars equipped with the improved train pipe couplers, the construction shown in Figs. 8 to 14, inclusive, being a modified form of the construction illustrated in Figs. 1 to 7, inclusive.

Fig. 9 is an enlarged longitudinal sectional view through one of the improved couplers.

Fig. 10 is an enlarged transverse sectional view through the cylinder and piston, taken substantially along the plane indicated by the line 10—10, Fig. 9.

Fig. 11 is an enlarged transverse sectional view through the shank, taken on the line 11—11 of Fig. 9, with the guide and support for the shank shown in elevation.

As to all matters herein which are common to my prior application for patent on Train pipe coupling, Serial No. 344,857, filed March 6, 1929, and to the present application, the present one is a continuation in part of the former and is filed as a substitute therefor, to cover later developed improvements of this invention along with the original invention.

Figure 7:
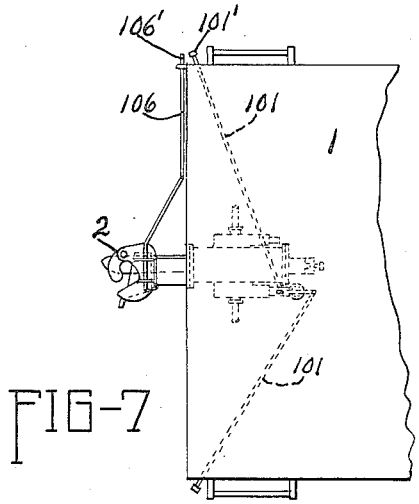
Fig. 7 is a partial plan view, illustrating my invention in its preferred form applied to a railway car.
Figure 6:
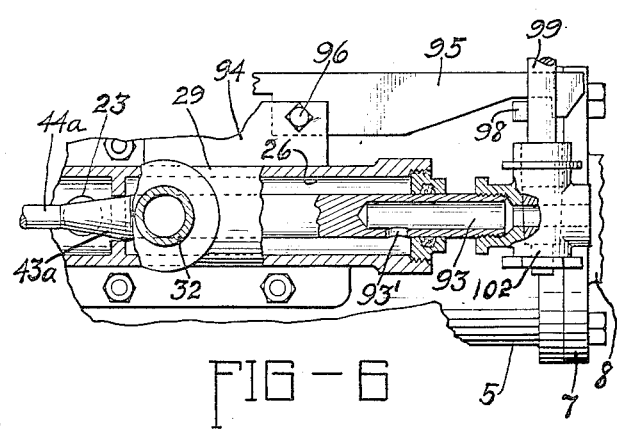
Fig. 6 is a detail elevational view, partly in section, illustrating the air brake valve closed, but its bleed valve open for setting the brakes upon accidental uncoupling.
Figure 12:
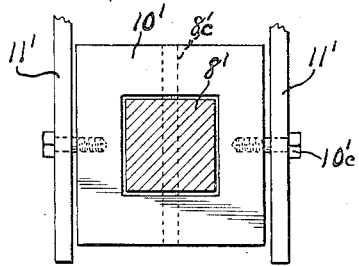
Fig. 12 is an enlarged transverse sectional view taken substantially along the plane indicated by the line 12—12, Fig. 9, with the socket for pivotally mounting the cylinder shown in elevation.

My improved train pipe coupling is adapted to be applied to a railroad car of a conventional construction and to connect the several train lines, such as the steam, signal, and air brake lines of the respective cars in operative relation. Fig. 8 of the drawings illustrates two box cars coupled together and having their train lines connected by a construction embodying my invention, and Fig. 7 illustrates my invention in its preferred form. The cars are denoted by the numeral 1, and the usual draw-bar couplers thereon by the numeral 2, each of which includes the mounting 3 and a guide 4. My improved train pipe coupling is mounted beneath said draw-bar coupler.

Reference will now be made to the specific construction of the preferred form of my invention, illustrated in Figs. 1 to 7, inclusive. This form comprises the cylinder 5 which may be of any suitable length and diameter, being closed at its forward and rearward ends by the heads 6 and 7, respectively. The rearward head 7 (see Figs. 1 and 4) carries a rearwardly extending lug or boss 8 which is slotted, for the reception of a tongue 9a on a connecting block 9 which has a similar tongue 9b on its opposite face to fit into a slot provided in a block 10 which is operatively connected to a bracket or hanger 11 carried by the car. In Fig. 4 this connecting means is illustrated as a bolt 12 which extends from the member 10 through the bracket or hanger 11, and the parts 8 and 9a are pivotally connected by a vertical pin 8c, while the parts 9b and 10 are connected by a horizontal pin 10c, thereby enabling horizontal and vertical swinging of the cylinder 5 with relation to the car frame.

A piston 13 is slidably mounted in the cylinder 5 and is provided with a shank or stem 14 which extends outwardly through a passage formed in the head 6 at the outer or forward end of the cylinder. The shank 14 is preferably non-circular in cross section so as to prevent the piston 13 from rotating in the cylinder 5, in order to retain the ports which open therefrom aligned and adapted to communicate with cooperating ports provided in the cylinder wall, said shank 14 being illustrated herein as substantially rectangular in cross section. A packing 15 (see Fig. 2) is provided between the head 6 and the shank 14 to prevent entry of dust, and piston rings 13a are mounted in the piston surface.

Passages 16, 17 and 18 are provided longitudinally through the shank 14, and have their forward ends extending laterally and opening through a face of the head 19 formed on the outer end of the shank 14, and the rearward ends of said passages extending substantially radially through the lateral wall of the piston 13, as best shown in Figs. 2 and 5. The rearward radial parts of these passages open through the wall of the piston 13, as denoted by the numerals 20, 21 and 22, and contain sockets at their extremities wherein are mounted apertured bearing members 20a, 21a and 22a, adapted to reduce wear of the interior wall of the cylinder and to provide leakproof connections when they, in the operative position, communicate with passages extending radially through the cylinder wall, denoted, respectively, by the numerals 23, 24 and 25, which communicate respectively, with the chambers 26, 27 and 28 in valve casings or tubular members 29, 30 and 31 of auxiliary valve devices mounted on the cylinder. Said apertured bearing members are oblong and have arched seats in their outer faces, which extend a distance forwardly and rearwardly beyond the radial parts and beyond the passages 23, 24 and 25 in the cylinder wall, to assure proper and sufficient registry therewith under the various conditions of operation. From these tubular valve members extend pipes 32, 33 and 34 which are connected, respectively, to the air, signal, and steam pipes of the train.

The rear or inner end of the piston 13 is provided with a socket 40 for the reception of one end of a spring 41, the other end of which surrounds a boss 42 on the inner face of the head 7. The spring 41 is thus held properly in place and urges the piston 13 outwardly toward the limit of its motion. When in fully extended position, there is no communication between the openings 20, 21 and 22 and the cooperating openings or passages 23, 24 and 25. However, when the couplers are coupled up the pistons are shoved in until the cooperating openings are in registry (see Figs. 2 and 5), whereby the several train pipes, for example, the air, signal, and steam pipes, of the two cars are put into communication.

The auxiliary valve devices are adapted to control the flow of fluid from the pipes to the cylinder passages 23, 24 and 25, in order to prevent the fluid, such as compressed air and steam, from remaining at high pressure in said passages, and from bearing heavily against the peripheral wall of the piston, when the head 19 is in extended or uncoupled position. This is to overcome the tendency of the highly compressed fluid from seeping around the piston, and to enable using the piston and cylinder for an extended time even though they are not perfectly milled.

A suitable construction of these valve devices is illustrated in Fig. 2, which includes a valve element 43 within tubular member 31 adapted to contact and close a valve seat 43', and this valve element is provided with a rod 44 extending forwardly through said tubular member. Similar valve mechanisms are provided in the tubular members 29 and 30, including the valve elements 43a and 43b and their valve rods 44a and 44b.

A bracket 45 has its front end 45' secured beneath head 19, and it extends rearwardly toward the steam valve member 31. At its rearward end it is connected to a substantially U-shaped yoke 46 having two arms 46a and 46b extending upwardly upon opposite sides of the cylinder 5. Said yoke and arms have openings provided therethrough for the reception of the rods 44, 44a and 44b. These rods have nuts 47 thereon whereby the position of the rods and, consequently, of the valves may be adjusted. There are other nuts near the ends of the rods, between which and the yoke are springs 48 which permit a certain amount of sliding movement between the rods and the yoke, though the nuts 47 are normally held against the yoke 46 by the springs 48. Braces 49 extend from the bracket to the yoke to brace the latter and prevent it from tipping when the shank 14 and piston 13 are shoved inwardly by engagement of the heads 19.

A framework is suspended from the car for resiliently supporting the forward end of the cylinder. This framework comprises hangers 52 having brackets 53 secured to their lower ends. Bolts 54 pass through these brackets and secure lower and upper cross members 55 and 56 thereto. Springs 57 and 58 surround the bolts 54 and resiliently press the cross members 55 and 56 against the brackets 53. This method of mounting permits the forward end of the piston to swing upwardly and downwardly about the pivotal mounting at its rearward end to compensate for the differences in height of the ends of adjacent cars and also to compensate for movement of the cars on account of irregularities in the tracks.

To center the piston and cylinder laterally with respect to the framework, plates 60 and 61 are secured to the forward end of the cylinder and have springs 62 connecting them to brackets 63 which are mounted on the hangers 52 and 53. Lateral pressure upon the head 19 causes one of the springs 62 to yield, thus permitting the cylinder to swing laterally about the vertical pivot at its rearward end.

Figure 15:
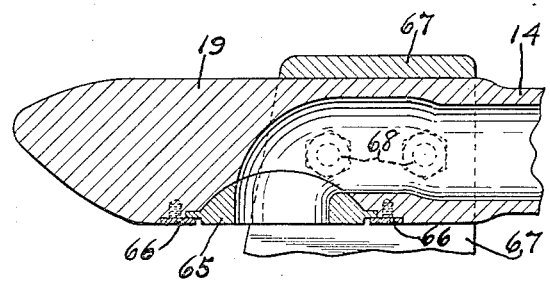
Fig. 15 is a partial horizontal longitudinal section of the coupling head of the preferred form of construction.

As best shown in Figs. 2, 4 and 15, the head 19 is recessed, and has a block 65 secured in the recess by means of strips 66. This block has apertures 16a, 17a and 18a which communicate with and constitute continuations of the lateral ends of the passages 16, 17 and 18 which extend longitudinally through the shank 14. The blocks have evenly ground faces, so that when two heads 19 are coupled, the openings through the blocks 65 are in alignment and the pipes of the several train lines are tightly coupled.

Figure 13:
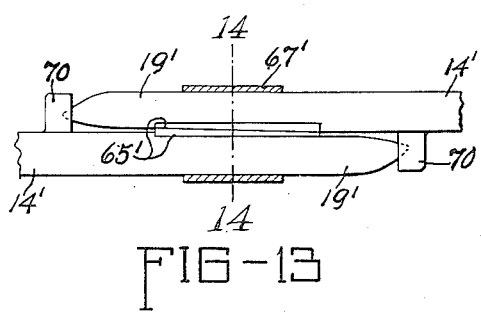
Fig. 13 is a top plan view illustrating the manner in which the shanks of companion couplers are connected.
Figure 14:
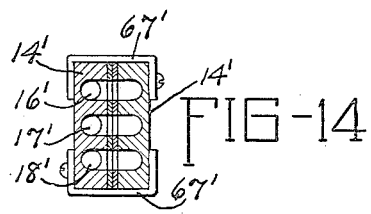
Fig. 14 is a transverse sectional view taken substantially along the plane indicated by the line 14—14 of Fig. 13.

In order to hold the blocks 65 of two coupled heads in close engagement with each other so as to prevent leakage between them, guides 67 are secured to the heads (see Fig. 4), to force them with their blocks 65 into close contact, as indicated diagrammatically by Fig. 13. The guides 67 may be held in place in any suitable manner, as, for example, by means of bolts 68. The bracket 45 is also held in place by means of some of these bolts 68. The guides 67 have flared outer portions to make it more certain that the heads 19 will enter the guides 67 and cause proper coupling of the train lines, on uneven tracks, sharp curves and the like.

By referring to Fig. 4, it will be seen that a plate 87 is loosely mounted in the guide 67 and may move toward and away from the head 19. This plate is notched to provide shoulders 88 at its upper and lower edges so as to prevent it from slipping rearwardly and out of the guide. At its rearward edge, it is provided with a strip 89 which prevents the plate from moving forwardly out of the guide but which is still removable so as to permit removal of the plate. An internally threaded socket 90 on the guide 67 has a screw plug 91 therein between which and the plate 87 is a spring 92 which presses the plate 87 inwardly so as to hold the two heads 19 in tight engagement. A plurality of such sockets, plugs and springs are preferably provided, as shown in Fig. 1. The inner faces of the upper and lower arms of the guide 67 are grooved for the reception of the plate 87, as shown at 88a in Fig. 3, thus preventing the plate from dropping out. The tension of the spring 92 may be adjusted by adjusting the plug 91, thus making it possible to compensate for wear of the parts.

In this invention the auxiliary air valve 43a (see Fig. 6) is made conical to a prolonged extent, so that during the initial period of opening of this valve the annular space or passage between the valve and its seat will be comparatively narrow, and said space will gradually become larger, in order to allow only a restricted volume of charged air to flow through the valve during the beginning of its opening movement. This feature is especially advantageous where a charged train pipe is coupled to an empty or substantially empty train pipe, whereby otherwise an emergency application of the brakes might be produced through the rapid drop of pressure in the charged pipe. By this construction the valve opening is initially limited and becomes gradually larger during its opening movement, to obviate any such undesired brake application during coupling of the cars and brake lines; while these auxiliary valves are likewise closed slowly, whereby to obviate the air and steam from remaining at full pressure in passages 23, 24 and 25, or from seeping around the piston when the main valves and auxiliary valves are in closed position.

A combination safety valve and control valve mechanism is provided in this form of my invention, which, as illustrated, is combined with the valve casing 29 and its auxiliary valve means 43a of the air-brake mechanism. I therefore preferably provide in the rear part of valve means 43a a chamber or pocket 93 having a port 93' thereon which is positioned so that it will be rearward or outside of casing 29 when head 19 is coupled and valve 43a is open (see Figs. 1, 2 and 4); but which is placed inside of casing 29 and communicates with air pipe 32 when head 19 is extended and valve 43a is closed (see Fig. 6), whereby it serves as an intake port for receiving and bleeding air from casing 29 and air pipe 32. I also secure to the valve casing 29 a bracket 94 whereon a hook-shaped actuator 95 is pivotally mounted at 96. A spring 97 actuates member 95 about its pivot but is capable of yielding so as to permit the hook to rise and ride over an arm or lug 98 extending laterally from the valve stem 99, and therefore, when actuated, causes rotation of the stem and core of a valve 102 which is mounted on the rearward end of valve element 43a and is in constant communication with chamber 93, thereby providing means for automatically opening valve 102.

For the purpose of manually operating the bleed valve 102, and especially for closing it, a cross-arm 100 is connected to the stem 99 and has a pair of actuating rods 101 connected thereto and extending laterally and diagonally to the sides of the car, each rod having an operating handle 101' on its end, so that the valve 102 can be opened and closed by a person at the side of the car, without any danger of him getting under same or between two cars.

A guide bar or rod 103 is fastened to the side of the valve 102 which is adjacent the cylinder 5 and serves to prevent rotation of the rod 44a and valve 102. Said guide rod 103 cooperates with an angular bracket 104 bolted to the head 7, as indicated at 105. This angular bracket has a forked end so that the guide rod 103 may slide in the notch between the parts of this end.

With this safety valve construction the valve 102 is open under normal operating conditions, as indicated in the drawings, and while the heads 19 are operatively coupled the port 93' is outside of air casing 29, and no bleeding of the air line can take place. However, if the train should break, and the head 19 is thereupon extended, then said port moves into said casing and receives the brake-air therefrom to convey it to valve 102 which is open, and thereby bleeds the air-brake line for setting the brakes in such an emergency. When a car or coach is uncoupled in the usual manner, then when the brakeman withdraws the coupling pin of the drawbar, by grasping handle 106' provided on the usual pin-lifter rod 106 and located at the side of the car, he can at the same time grasp the handle 101' and actuate valve rod 101 to close valve 102, so that when the heads 19 are thereupon extended, no bleeding of casing 29 and the train pipe will result at the free or uncoupled end of each car. When the heads are coupled, then the safety valve 102 is again automatically opened or set by actuator 95 as explained above.

This safety valve mechanism is furthermore very useful as a control valve device for slackening the speed of a car or coach and stopping it in a desired spot. The brakeman or person located at the side of the car, whether on the ground or on the car ladder, after he has actuated the pin-lifter handle 106' for cutting out a car or coach, can then conveniently manipulate handle 101' so as to open valve 102 intermittently to apply the airbrakes for slackening the speed of the car and to stop it in the desired spot. This construction thus renders this device suitable for conveniently shunting and spotting individual cars and coaches, while remaining safely at the side of the cars, and without going on top of or within or between the same.

Longitudinal keys 107 are arranged in slots in the cylindrical surface of the piston and are forced outwardly by springs 108 which keep in close contact with the internal wall of the cylinder to prevent transverse leakage between the openings 20, 21 and 22. These keys should extend between the inner piston rings 13a so as to reduce to a minimum the amount of leakage through the space between the cylinder and piston. The cylinder 5 is provided with a vent opening 109 near its rearward end to permit venting of air entrapped between the piston 13 and head 7 and to permit air to enter into this space when cars are uncoupled. This opening also permits drainage of any moisture which may condense in the cylinder.

Figs. 8 to 14, inclusive, illustrate the form of construction which is reproduced from my prior application Serial No. 344,857, identified above, and the structure shown therein operates upon the same principle as that shown in Figs. 1 to 7, and 15, inclusive, as described above. Parts carrying the same numerals as used in the foregoing description are substantially identical, and those having the same numerals with a suffix are similar and have a similar function.

In this form a piston 13' is slidably mounted in cylinder 5' and lugs 70 are provided on shanks 14' which are engaged by the heads 19', to prevent said heads from passing each other too far, and the ends of the openings 20', 21' and 22' will be brought to register with the openings 23', 24' and 25' which extend through the cylinder wall, like in the form described above. As shown in Fig. 10, these openings 20', 21' and 22' may have enlargements 71, 72 and 73 to insure that there will be ample registration, even though there may be wear of the parts.

Particular reference will now be made to Figs. 9 and 11 for a description of the head-centering apparatus herein, which differs somewhat from that described above. In this construction a frame 74 is secured to the under side of the car, and it has bolts 75 extending through it into guide-bars 76. Surrounding these bolts 75 and exerting pressure between the frame 74 and the guide-bars 76 are springs 77 which exert pressure inwardly upon these bars to cause them to engage the lateral sides of the shank 14'. These, therefore, hold the head 19' centrally and yieldably positioned so that there may be lateral swinging of the head, shanks and cylinders as necessitated by the swaying of the cars or their passing around curves.

To centrally position the shank 14', vertically, pins 78 extend inwardly from the frame 74 into blocks 79 which engage the upper and lower surfaces of the shank 14'. Between the frame and these blocks 79 are located springs 80 which exert pressure in opposite directions upon the shank. In this way, the shanks are always held properly positioned vertically, to be coupled up automatically when two cars are brought together to be coupled.

Piston rings 13a are provided in the surface of the piston 13' to prevent leakage of the air and steam past the piston, as in the preferred form of this invention.

Figure 16:
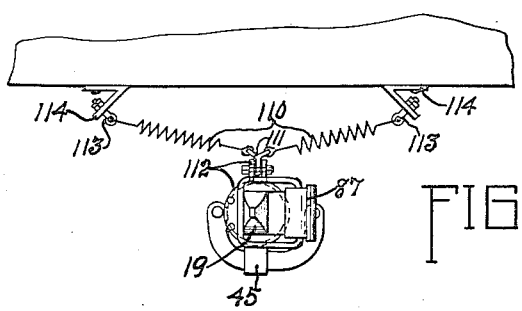
Fig. 16 is a front elevation, showing a modified form of the supporting means.

Fig. 16 illustrates a modified and simplified form of front bracket for supporting the forward end of the cylinder. This comprises a pair of springs 110 which have their lower ends connected, by suitable means 111, to the top end portions of a curved band or yoke 112 which is clamped around the forward end of the cylinder 5. Said springs diverge upwardly, and their upper ends are attached to eyebolts 113 which are adjustably connected to brackets 114 mounted underneath the car, thereby providing for adjustment and to compensate for any variation in the length of the springs. This construction provides a very simple and economical front bracket for my train pipe coupling device.

I claim as my invention:

1. A train pipe coupling comprising a cylinder, a piston slidable in said cylinder and having a portion extending through the outer end of the cylinder, a passage being formed longitudinally through the piston with its inner end portion extending transversely and opening through the side of the piston, the walls of the cylinder being formed with an inlet to communicate with the inner end of said passage when the piston is moved inwardly, means to yieldably resist inward movement of said piston, a neck extending from the inner end of said cylinder, a socket member fitting loosely about said neck, vertical pivot pin means provided in the socket and neck to permit horizontal swinging of the cylinder, supports at opposite sides of said socket member, pivots connecting the socket with said supports to permit vertical swinging of the cylinder, and a guide slidably and swingably supporting said portion.

2. A train pipe coupling comprising a cylinder, a piston slidable in said cylinder and having a portion projecting from the outer end thereof, means to yieldably resist inward movement of said piston, said cylinder having an air inlet and the piston being formed with an air passage closed at its inner end when the piston is in its normal position, a neck extending from the inner end of said cylinder, a socket member fitting loosely about said neck, a pivot pin extending vertically through the socket and neck to permit horizontal swinging of the cylinder, supports at opposite sides of said socket member, pivots connecting the socket member with said supports to permit vertical swinging of the cylinder, and a guide slidably and swingably supporting said portion.

3. A train pipe coupling comprising a pair of similar connectors which are laterally inflexible while coupled, each comprising elements relatively slidable longitudinally but laterally inflexible, said pair of connectors being mounted on adjacent ends of a pair of cars and, when so mounted, having a plurality of conduits connected together so that the conduits of the two cars will be connected and in open communication, the relatively longitudinally slidable elements having longitudinal openings therethrough, one terminus of each of said openings being connected in fluid-tight relation to a corresponding opening of the other element and the other terminus of each opening being connected to its corresponding conduit, each connector mounting having a pivotal mounting enabling it to pivot in a vertical direction and a second pivotal mounting enabling it to turn in a horizontal direction.

4. In a coupler of the class described, the combination of a cylinder having a reciprocable piston therein and a plurality of openings extending laterally through the wall thereof intermediate the ends of the cylinder, a plurality of pipes being connected in open communication with the openings, the piston having lateral openings corresponding to and communicating with the openings through the wall of the cylinder in a certain position of the piston with relation to the cylinder, the openings of the piston and cylinder being normally held out of registry when the coupler is uncoupled, a stem extending from one end of the piston through one end of the cylinder, said stem having a plurality of openings in a lateral face thereof adjacent to the exposed end of the stem and having longitudinal openings connecting the last named openings with the openings in the piston, the cylinder having a pair of pivotal mountings, one enabling it to swing horizontally and the other enabling it to swing vertically, and resilient means normally holding the cylinder and piston in a centralized position but making it possible for them to swing horizontally or vertically upon the application of force during the operation of the apparatus.

5. In a train-line coupler, a cylinder supported at one end to swing vertically and horizontally, resilient means connected adjacent to the opposite end of the cylinder to normally hold the same in a central position with relation to its support, a piston slidably mounted in said cylinder and having a stem extending outwardly through an end thereof, resilient means within the cylinder between its opposite end and the opposite end of the piston to normally hold the stem projected, said stem having a head at its outer end and a set of openings upon a lateral face of said head, said stem also having longitudinal openings extending from the first mentioned openings through the stem and into the piston, the inner end of the openings turning laterally and opening through the lateral face of the piston to register with a companion set of openings in the cylinder wall when the piston is in retracted position, one set of said companion openings being enlarged so as to register readily with the other set.

6. In a train-line coupler, a cylinder having a pair of removable heads, one of said heads having an opening therethrough and the other head having a post projecting outwardly therefrom, said post being connected to a car by pivots arranged transversely to each other, said cylinder having openings through its lateral wall arranged peripherally thereof, a piston fitting within and sliding in the cylinder and having a shank extending through the opening in the head, said opening and shank being constructed to prevent relative turning movement thereof, the shank having longitudinal openings therein whose ends extend laterally to the surface of the piston and to one face of the shank, the openings to the surface of the piston being arranged to register with the openings through the cylinder wall when the piston is retracted.

7. In a train-line coupler, a cylinder having a pair of removable heads, one of said heads having a post projecting outwardly therefrom, said post being connected to a car by pivots arranged transversely to each other, said cylinder having a set of openings through its lateral wall arranged peripherally therethrough, a piston fitting within and sliding in the cylinder and having a shank extending through the opening in said head, said opening and shank being constructed to prevent relative turning movement thereof, said shank having a set of longitudinal openings therein whose ends extend laterally to the surface of the piston and to one face of the shank, the set of openings to the face of the piston being arranged to register with and cooperate with the companion set of openings through the cylinder wall, one set of said companion openings being enlarged so as to register readily with the other set.

8. In a train-line coupler, a cylinder having a pair of heads, said cylinder having openings through its lateral wall, arranged peripherally thereof, one head having an opening therethrough, a piston within and sliding within the cylinder and having a shank extending through the opening in said head and being constructed to prevent turning in said opening, said shank having longitudinal openings therein whose ends extend laterally to the surface of the piston and to one face of the shank, the openings to the face of the piston being arranged to register with and cooperate with the openings through the cylinder wall.

9. In a train-line coupler, a cylinder having a pair of heads, said cylinder having a set of openings through its lateral wall, arranged peripherally thereof, one head having an opening therethrough, a piston within and sliding within the cylinder and having a shank extending through the opening in said head, said opening and shank being constructed to prevent relative turning movement thereof, said shank having a set of longitudinal openings therein whose ends extend laterally to the surface of the piston and to one face of the shank, the openings to the face of the piston being arranged to register with and cooperate with the companion set of openings through the cylinder wall, the piston having depressions in its peripheral wall surrounding the openings therein so as to register readily with the other openings of the cylinder wall.

10. In a train-line coupler, a pair of similar cylinders and means for operatively mounting them beneath the adjacent ends of a pair of cars, said cylinders having each a set of apertures in the peripheral wall, each cylinder containing a reciprocating piston having a stem extending through the forward end of the cylinder, said piston and stem containing a set of longitudinal passages whose rear ends extend laterally to the surface of the piston, adapted to register with the apertures in the cylinder when the stems are retracted, and a head at the forward end of each stem provided with a lateral face having a set of ports therein, the forward ends of said passages extending laterally and terminating in said ports, the pair of coupler faces and the sets of ports therein being positioned in a plane which lies between and substantially parallel to the axes of the pair of pistons and cylinders while coupled, thereby maintaining a fluid-tight connection between said ports and passages.

11. In a train-line coupler, a cylinder having a pair of removable heads, one of said heads having a post projecting outwardly therefrom, said post being connected to a car by pivots arranged transversely to each other, said cylinder having openings through its lateral wall arranged peripherally thereof, the second head having an opening therethrough, a piston fitting within and sliding in the cylinder and having a shank extending through the opening in said head, said opening and shank being constructed to prevent relative turning movement thereof, the shank having longitudinal openings therein whose ends extend laterally to the surface of the piston and to one face of the shank, the openings to the surface of the piston being arranged to register with and cooperate with the openings through the cylinder wall, a frame surrounding and spaced from said shank, and springs between said frame and shank and holding the latter centralized in position with relation to the former.

12. In a train pipe coupling comprising a cylinder and means for mounting it on a car to swing freely with relation thereto, said cylinder having a set of apertures through its peripheral wall, an elongated piston slidable in the cylinder and having a stem extending through its forward end, a coupling head on the stem, said piston and stem and head having a set of longitudinal passages therein with their rear ends turned laterally and terminating in the lateral surface of the piston, adapted to register with the cylinder apertures when the piston is retracted, the forward ends of the passages terminating in said head, and auxiliary valves on the cylinder, over said apertures, including stationary fluid conducting members and movable members therein, for controlling the flow of charged fluid through said apertures and prevent it from pressing heavily against the lateral surface of the piston and leaking therearound while extended.

13. In a train pipe coupling comprising a cylinder and means for operatively mounting it beneath a car, said cylinder having an aperture in its peripheral wall, an elongated piston slidably mounted within said cylinder and having a passage extending longitudinally therein with its rear end terminating in the lateral surface of the piston adapted to register with the cylinder aperture when the piston is retracted and not to register when the piston is extended, an auxiliary valve mechanism mounted on the cylinder, including a conduit adapted to conduct fluid from the train line to said aperture and a movable member therein operated by the piston, for controlling the flow of fluid to said aperture and passage, whereby the highly charged fluid in the train line is prevented from flowing to and pressing against the surface of the piston while it is extended.

14. In a train pipe coupling device adapted to be mounted on a car that has a drawbar provided with a pin-lifter rod extending to the side of the car, comprising a member provided with a fluid passage, and valve means for controlling the flow of fluid through said passage which is opened and closed, respectively, by the coupling and the uncoupling of the cars; safety valve means associated with said control valve means actuated and opened automatically to bleed the train line for setting the brakes when the train breaks apart and the head is extended, means including a member positioned at the side of the car, and readily operated along with the pin-lifter rod, for manually operating said safety valve means.

15. In a train pipe coupling comprising a pair of members movable relative to each other and including a fluid passage and means for controlling the flow of fluid therethrough, a valve associated with said control means adapted to close the passage and to restrict fluid from initially flowing in full volume from a charged train pipe into an empty one and causing application of the brakes, a safety valve associated with said valve and adapted to bleed the train line for applying the brakes when the head is accidentally uncoupled, and means for manually opening and closing said safety valve.

16. In a train pipe coupling comprising a piston provided with a fluid passage, means for operatively supporting the piston on a car and including valve means for controlling the flow of fluid through said passage, an auxiliary valve including a casing interposed between said valve means and the train line adapted to conduct fluid from the latter to said valve means and passage, and having an element movable with the piston to close said auxiliary valve upon uncoupling of the cars, said element being so constructed and arranged as to impede the full flow of air through the train line from rushing from a charged train line into an empty one upon the coupling operation to avoid sudden application of the brakes.

17. In a train pipe coupling comprising a head and means for supporting it on a car, said head and means being provided with a fluid passage and valve means therefor including a conduit arranged to conduct fluid from the train line thereto, a safety valve connected to the conduit and in open communication with said valve means while the head is extended, actuating means operated automatically by the outward movement of the head to open the safety valve for bleeding the train line to apply the brakes when a pair of heads accidentally separate, and means connected with the safety valve for manually closing said valve when the cars are ordinarily uncoupled and adapted for manipulating said valve to apply the brakes selectively.

18. In a train pipe coupling comprising a cylinder and means for mounting it on a car, the cylinder having an aperture in its peripheral wall, a piston slidably mounted in the cylinder and having a passage longitudinally therein which terminates at its rear in the lateral surface of the piston adapted to register with the cylinder aperture when the piston is retracted, a coupling head connected with the piston and having a port connected with said passage, valve means mounted on the cylinder over said aperture and adapted to prevent highly charged fluid in the train line from flowing to and pressing heavily against the surface of the piston while it is extended, a safety valve connected to said valve means and in open communication therewith when the head is extended but not when the head is retracted, means for automatically opening the safety valve by the separating of a pair of heads, whereby to bleed the train line if the train breaks and the head becomes extended, and means for closing the safety valve manually when the cars are ordinarily uncoupled and adapted for manipulating said valve to apply the brakes with selected effect.

19. In a train pipe coupling comprising an outer tubular member mountable on a car and having a side port, a member slidable therein containing a longitudinal passage having its inner end registrable with said port, a valve including a casing mounted on said outer member over said port adapted to conduct fluid from the train line thereto, a valve element in said casing movable along with said slidable member and adapted to prevent compressed fluid in the air line from flowing in its full volume from a charged train pipe into an empty one and causing application of the brakes, a safety valve connected to said casing which is automatically set upon coupling of the car to be actuated to bleed the train line for applying the brakes when the car becomes accidentally uncoupled, and means for operating the safety valve extending to the side of the car to be readily accessible to a person free from the car.

20. In a train pipe coupling comprising a cylinder mountable on the car and having a side port, a member slidable therein and extendible therefrom having a coupling head at its outer end and containing a passage extending therefrom and at its inner end being registrable with said port, a casing mounted over said port adapted to conduct fluid from the train line thereto, a safety valve including a channelled member connected to the casing and providing communication between the valve and casing, said valve being automatically opened and the channelled member being moved out of communication with the casing upon the coupling of the cars and the retraction of the slidable member but being moved in communication with the casing and the train line to bleed the latter for applying the brakes when the coupling becomes uncoupled and the slidable member becomes extended, and conveniently operable means for closing the safety valve on an uncoupled coupling to prevent bleeding of the train line.

21. In a train pipe coupling comprising an outer tubular member mountable on the car and having a side port, a member slidable therein and extendible therefrom containing a longitudinal passage having its inner end registrable with said port, a valve including a casing mounted on said outer member over said port adapted to conduct fluid from the train line thereto, a valve element in said casing movable along with said slidable member and adapted to prevent charged fluid from the train line from initially flowing in full volume from a charged train pipe into an empty one and causing application of the brakes, a safety valve which is automatically opened and moved out of communication with the casing upon the coupling of the cars and the retraction of the slidable member, but is moved into communication with the casing and train line to bleed the same for applying the brakes when the coupling becomes uncoupled and the slidable member becomes extended, and conveniently operable means for manually closing the safety valve on an uncoupled coupling to prevent undesired bleeding of the train line.

HERMAN P. PETZNICK.